United States Patent
Put et al.

(10) Patent No.: US 9,533,459 B2
(45) Date of Patent: Jan. 3, 2017

(54) STITCHER AND METHOD FOR STITCHING TOGETHER STRIPS OF RUBBER MATERIAL

(75) Inventors: Marco Johan Put, TH Amersfoort (NL); Cornelis Wouteres Janszen, ZL Harderwijk (NL)

(73) Assignee: VMI HOLLAND B.V., Epe (NL)

( * ) Notice: Subject to any disclaimer, the term of this patent is extended or adjusted under 35 U.S.C. 154(b) by 1091 days.

(21) Appl. No.: 13/642,928

(22) PCT Filed: Nov. 3, 2011

(86) PCT No.: PCT/NL2011/050751
§ 371 (c)(1),
(2), (4) Date: Oct. 23, 2012

(87) PCT Pub. No.: WO2012/099458
PCT Pub. Date: Jul. 26, 2012

(65) Prior Publication Data
US 2013/0160687 A1 Jun. 27, 2013

Related U.S. Application Data

(60) Provisional application No. 61/419,945, filed on Dec. 6, 2010.

(30) Foreign Application Priority Data

Dec. 6, 2010 (NL) ..................................... 2005819

(51) Int. Cl.
*B29C 65/62* (2006.01)
*B29D 30/42* (2006.01)
(Continued)

(52) U.S. Cl.
CPC ............... *B29D 30/42* (2013.01); *B29C 65/62* (2013.01); *B29C 66/0322* (2013.01);
(Continued)

(58) Field of Classification Search
CPC .............. B29D 30/28; B29D 2030/422; B29D 2030/424; B29C 66/0322; B29C 66/81465; B29C 66/83431; B29C 66/83433; B29C 66/855
(Continued)

(56) References Cited

U.S. PATENT DOCUMENTS 4,208,842 A * 6/1980 Katzke .................... B24B 7/005
125/11.19
4,892,608 A 1/1990 Lippa
(Continued)

FOREIGN PATENT DOCUMENTS

| DE | 197 07 367 C1 | 6/1998 |
| EP | 0 698 479 A1 | 2/1996 |
| EP | 1 555 113 A1 | 7/2005 |

*Primary Examiner* — Geoffrey L Knable
(74) *Attorney, Agent, or Firm* — Ladas & Parry LLP (57) ABSTRACT

A stitcher (1) for connecting strips of rubber material (4, 5) into a substantially continuous strip according to this invention comprises a surface (3), a stitching head (6) placed over it having a stitch unit (7) for stitching the strips of rubber material together along a stitch line, which stitch line includes an angle α having a longitudinal direction (L) of the continuous strip, a drive mechanism for driving a relative movement of the stitching head with respect to the surface along a first (X) and a second (Y) direction, wherein the second direction is oriented transverse to the first direction, and a control device (11) for controlling the drive mechanism such that the stitch unit follows the stitch line. In one embodiment the stitching head is rotatably connected to the drive mechanism wherein the axis of rotation extends transverse to the surface. The stitching head furthermore comprises a wheel (15) that is placed at a distance from the axis of rotation, wherein the wheel with its tread abuts the surface.

14 Claims, 6 Drawing Sheets

(51) Int. Cl.
*B29D 30/28* (2006.01)
*B29C 65/00* (2006.01)
*B29L 30/00* (2006.01)

(52) U.S. Cl.
CPC ...... *B29C 66/1142* (2013.01); *B29C 66/1162* (2013.01); *B29C 66/43* (2013.01); *B29C 66/49* (2013.01); *B29C 66/71* (2013.01); *B29C 66/81465* (2013.01); *B29C 66/81469* (2013.01); *B29C 66/8362* (2013.01); *B29C 66/83431* (2013.01); *B29C 66/845* (2013.01); *B29D 30/28* (2013.01); *B29C 66/72141* (2013.01); *B29C 66/73752* (2013.01); *B29L 2030/00* (2013.01)

(58) Field of Classification Search
USPC ......... 156/264, 304.1, 134, 406.4, 408, 413, 156/421, 512, 544, 906, 907
See application file for complete search history.

(56) References Cited

U.S. PATENT DOCUMENTS

| | | | |
|---|---|---|---|
| 5,228,941 A | 7/1993 | Panicali | |
| 2003/0051794 A1 | 3/2003 | Suda et al. | |
| 2005/0077011 A1 | 4/2005 | Pialot | |
| 2006/0011285 A1* | 1/2006 | Suda | B29D 30/305 156/117 |
| 2007/0079921 A1* | 4/2007 | Phippen et al. | 156/130.3 |

* cited by examiner

STITCHER AND METHOD FOR STITCHING TOGETHER STRIPS OF RUBBER MATERIAL

RELATED APPLICATION INFORMATION

This application is a 371 of International Application PCT/NL2011/050751 filed 3 Nov. 2011 entitled "stitcher and method for stitching together strips of rubber material", which was published in the English language on 26 Jul. 2012, with International Publication Number WO 2012/099458 Al, and which claims priority from Netherlands Patent Application 2005819, filed 6 Dec. 2010, and U.S. Provisional Application No.: 61/419,945 filed 6 Dec. 2010, the content of which is incorporated herein by reference.

BACKGROUND OF THE INVENTION

The invention relates to a stitcher and a method for stitching strips of rubber material together into a substantially continuous strip.

For manufacturing for instance an unvulcanized tyre or air spring with components of rubber material, use is often made of one or more strips of rubber material that have to be stitched together. In that case the stitch is placed at an acute angle to the longitudinal direction of the strips so that the stitch will extend at least partially over the circumference of the unvulcanized tyre or air spring.

When manufacturing an unvulcanized tyre or air spring use is also made of one of more strips of a cord-reinforced rubber material. In that case the reinforcement cords need to be placed at an angle α to the longitudinal direction of the strip. As basic material for the manufacturing of the substantially continuous strip, use is made of a roll of rubber material, in which reinforcement cords have been embedded in the longitudinal direction. The cords embedded in the rubber material may for instance be of steel, rayon or a synthetic material, such as nylon, polyester or aramid, or the like. In a cutting system strips of cord-reinforced rubber material are cut one by one at an angle, the cutting angle α, from the roll of rubber material. As a result the strips in general have the shape of a parallelogram, having a substantially triangular leading tip en a substantially triangular trailing tip. The individual strips are transported one after the other by a supply device to a stitcher, after which the edges of two consecutive strips of cord-reinforce rubber material are stitched together, preferably by means of butt stitching or butt splicing, into a substantially continuous strip of cord-reinforced rubber material, wherein the reinforcement cords and the longitudinal direction of the continuous strip substantially include an angle α.

In case of butt stitching the strips of in general sticky unvulcanized rubber material are pressed against each other and for instance a stitching roller is moved over the stitch so that the strips will start to form one unity. The outer ends of the strips are placed butt against each other, substantially without overlap.

A device for manufacturing such a substantially continuous strip of rubber material in this way is for instance known from European patent publication 0 698 479 A1. In this document a stitcher is described having a stitching head with stitch unit placed over the stitch table, wherein the stitching head is movable along a straight guide or rail, defining a stitch line, wherein the stitch line and the longitudinal direction of the continuous strip include an angle α. The guide or rail is placed over the stitch table so as to be slightly rotatable, so that aligning the stitching head with respect to the edges of the strips to be stitched is possible.

A drawback of said known device is that the angle α to be set is limited, as a result of which the device is unsuitable for manufacturing different substantially continuous strips of for instance cord-reinforced rubber material having a wide range of angles α to be set between the reinforcement cords and the longitudinal direction of the continuous strip.

This problem could for instance be solved by increasing the angle of rotation over which the guide or rail can be rotated. However, for obtaining a larger angle of rotation, particularly for obtaining smaller angles α, the rail should be much longer than the continuous strips are wide. For accurate stitching with such a long rail, a firm and therefore heavy structure is required in order to counteract the possibility of the rail sagging.

SUMMARY OF THE INVENTION

It is an object of the present invention to provide a stitcher with which in a simple manner the angle α between the stitch line and the longitudinal direction of the continuous strip can be set.

According to a first aspect the invention for that purpose provides a stitcher for stitching or splicing strips of rubber material together into a substantially continuous strip, comprising:

a surface for placing thereon at least the edges of the strips of rubber material to be stitched or spliced together, a stitching head including stitch unit placed over the stitch table for stitching the edges of the strips of rubber material together along a stitch line, wherein the stitch line and a longitudinal direction of the continuous strip include an angle α, a drive mechanism for driving a relative movement of the stitching head with respect to the surface along a first and a second direction, wherein the second direction is oriented at least substantially transverse to the first direction, and a control device for controlling the drive mechanism for the relative movement of the stitching head with respect to the surface along the first and/or second direction such that the stitch unit at least substantially follows the stitch line.

The stitcher according to the invention uses a substantially orthogonal drive. That means that the drive mechanism of the stitcher according to the invention by means of a first drive is able to move the stitching head relative with respect to the surface in a first direction, for instance along an X-axis, and by means of a second drive is able to move relative with respect to the surface in a second direction, for instance along a Y-axis, wherein the Y-axis extends substantially transverse to the X-axis. By suitable control of the first and second drive by the control device, the stitching head and/or the surface can be moved relative with respect to each other, so that the stitching head can be moved relative with respect to the surface along any wanted line within the plane spanned by the X-axis and Y-axis, and the angle α can in principle be set within a range of 0-90 degrees.

Such an XY-controlled stitcher has the further advantage that the space the drive mechanism takes up can be substantially limited to the space over the stitch table. In the known stitcher with a long rail for achieving a larger range of the angle of rotation, said rail will project more beyond the stitch table as the angle α increases, particularly as the angle α approaches 90 degrees.

Another advantage of such an XY-controlled stitcher according to the invention is that the stitching head can be moved relative to the surface to any wanted starting point of the stitch line within the plane spanned by the X-axis and the Y-axis. Particularly when changing the angle α, in general the position of the strips of rubber material will change as well at the cutting device. This also means that in the known devices adaptations are required to position the edges of two consecutive strips adjacently in the correct manner for stitching and/or for placing the edges of two consecutive strips in the correct position on the stitch line prior to stitching. In the device according to the invention it is possible to adjust the starting point of the stitch line as well in case of a change of the angle α. This is particularly advantageous in a method for stitching strips of rubber material as described in Dutch patent application 2004213 of the applicant, wherein the edges of two consecutive strips, prior to cutting the second strip, are placed together such that further down the process said edges are connected to each other by means of a stitch. In the device according to the state of the art said edges that are placed together have to be placed accurately under the stitcher so that the stitch line coincides with the edges. In the device according to the invention said edges placed together only need to be moved within the plane spanned by the X-axis and the Y-axis in order to be stitched.

However, as for stitching usually use is made of a stitching roller, it is required that whenever the angle α is changed, the stitching head is put in the correct orientation as well, so that the stitching roller is able to roll correctly along the stitch line. In case the alignment of the stitching roller does not have the correct orientation, the rubber material may deform during stitching as a result of which a faulty stitch is obtained.

In order to solve this problem, in one embodiment the stitching head is connected to the drive mechanism so as to be rotatable about an axis of rotation, wherein the axis of rotation extends at least substantially transverse to the surface, and wherein the stitching head comprises a wheel placed at a distance from the axis of rotation, wherein the wheel with its tread abuts the surface.

In this embodiment the substantially correct orientation of the stitching head can easily be set. For that purpose the stitching head in the device according to the invention is connected to the drive mechanism so as to be rotatable about the axis of rotation, wherein the stitching head comprises a wheel that is spaced apart from the axis of rotation, wherein the wheel with its tread abuts the surface or at least one of the strips of rubber material, if such strips have been placed on the surface. In case of a movement of the stitching head along the stitch line the wheel that is spaced apart from the axis of rotation will be oriented in movement direction behind the axis of rotation, as a result of which a substantially uniform orientation is provided to the stitching head, and thus to the stitch unit with stitching roller, that is related to the movement direction and therefore to the set angle α. Thus the stitching head can easily be aligned for stitching at the set angle α.

In one embodiment the stitcher comprises a stitch table, wherein the surface is a side of the stitch table facing the stitch unit, and wherein the drive mechanism comprises a first drive for moving the stitching head in the first direction and a second drive for moving the stitching head in the second direction.

In an alternative embodiment the stitcher comprises a belt conveyor having a conveyor belt, wherein the surface is a side of the conveyor belt facing the stitch unit, and wherein the drive mechanism comprises a first drive for moving the conveyor belt in the first direction and a second drive for moving the stitching head in the second direction. In that case the conveyor belt can on the one hand be used for moving the strips of rubber material during stitching, and on the other hand be used for discharging the stitched strips from the stitch position so that it will become available again for a next stitch.

In a further alternative embodiment the stitcher comprises a building drum rotatable about an axis, wherein the surface is a circumferential side of the building drum facing the stitch unit, and wherein the drive mechanism comprises a first drive for rotatingly driving the building drum for moving the circumferential surface in the first direction and a second drive for moving the stitching head in the second direction. The invention can also be applied on a building drum for stitching strips of rubber material together to form a green tyre or a part thereof. On the building drum a leading edge of a strip can also be stitched to a trailing edge of the same strip for forming a cylindrical element of the rubber material.

In one embodiment the wheel is moveable between a first position in which the wheel with its tread abuts the surface or at least one of the strips of the rubber material, and a second position in which the wheel is placed at a distance over the surface. In case stitching needs to take place many times along substantially the same stitch line, the wheel, after use in an initial alignment of the stitching head, can be moved upwards or folded up. In that way the wheel will remain spaced apart over the strip in the further manufacturing of the substantially continuous strip, in order to avoid possible interruption of the stitching process or a possible disruption of the stitch.

In one embodiment the stitching head comprises a tensioning member, wherein the tensioning member is adapted for, when operational, pushing the wheel towards the surface. The tensioning member can comprise a spring or a resilient material. The tensioning member can reduce the chance of the wheel slipping, which slipping could result in an incorrect alignment of the stitching head.

In one embodiment the tensioning member comprises a pneumatic cylinder. With this tensioning member the magnitude of the pressure with which the wheel is pushed towards the surface can be set. In a further embodiment the pneumatic cylinder can also be adapted for moving the wheel between the first and second position.

In one embodiment the stitching head comprises a retaining device or locking device for retaining or locking the stitching head against a rotation of the stitching head about the axis of rotation. By retaining or locking, it can substantially be avoided that the alignment of the stitching head will wander.

In one embodiment the first direction, the X-axis, is oriented substantially parallel to the longitudinal direction and the second direction, the Y-axis, is oriented substantially transverse to the longitudinal direction.

In one embodiment the stitch unit is a first stitch unit and the stitching head comprises a second stitch unit, wherein the second stitch unit is placed in line behind the first stitch unit, and wherein the wheel is placed in line with both the first and the second stitch unit. In case of a movement of the stitching head along the stitch line the wheel that is spaced apart from the axis of rotation will in movement direction be oriented behind the axis of rotation, as a result of which the connecting line between the first and second stitch unit and the wheel is aligned with respect to the stitch line, so that after alignment the connecting line and the stitch line substantially coincide.

According to a second aspect the invention for that purpose provides a method for stitching strips of rubber material together into a substantially continuous strip using a stitcher as described above, the method comprising the steps of:

a. providing information to the control device regarding the desired angle α of the stitch line with respect to the first direction, b. the control device controlling the drive mechanism for driving a relative movement of the stitching head with respect to the surface along the first and/or second direction such that the stitch unit at least substantially follows the stitch line with the desired angle α.

In one embodiment the method comprises step c wherein, during the relative movement of the stitching head, the wheel with its tread rolls over the surface or over at least one of the strips of the rubber material and the stitching head is rotated about the axis of rotation, at least until the connecting line between the axis of rotation and the wheel is substantially parallel to the stitch line with the desired angle α.

In one embodiment prior to step b. the wheel was or is placed in a first position in which the wheel with its tread abuts the surface or at least one of the strips of the rubber material, and the wheel after step c. is placed in a second position in which the wheel is placed at a distance over the surface.

In one embodiment the stitching head comprises a tensioning member, wherein the tensioning member, at least during at least a part of the movement of step c., pushes the wheel towards the surface.

In one embodiment the stitching head comprises a retaining device or locking device, wherein prior to step b. the retaining device or locking device is uncoupled or unlocked as a result of which the stitching head is rotatable about the axis of rotation, and wherein at the end of step c. or after step c. the retaining device or locking device is coupled or locked for substantially blocking a rotation of the stitch unit about the axis of rotation.

In one embodiment after step c. one or two strips of rubber material with at least their edges that are to be stitched together are placed on or near the stitch line on the surface, after which the control device controls the drive mechanism for moving the stitching head along the stitch line for stitching the edges together.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

SHORT DESCRIPTION OF THE DRAWINGS

The invention will be elucidated on the basis of a number of exemplary embodiments shown in the attached drawings, in which.

DETAILED DESCRIPTION OF THE DRAWINGS

Figure 1:
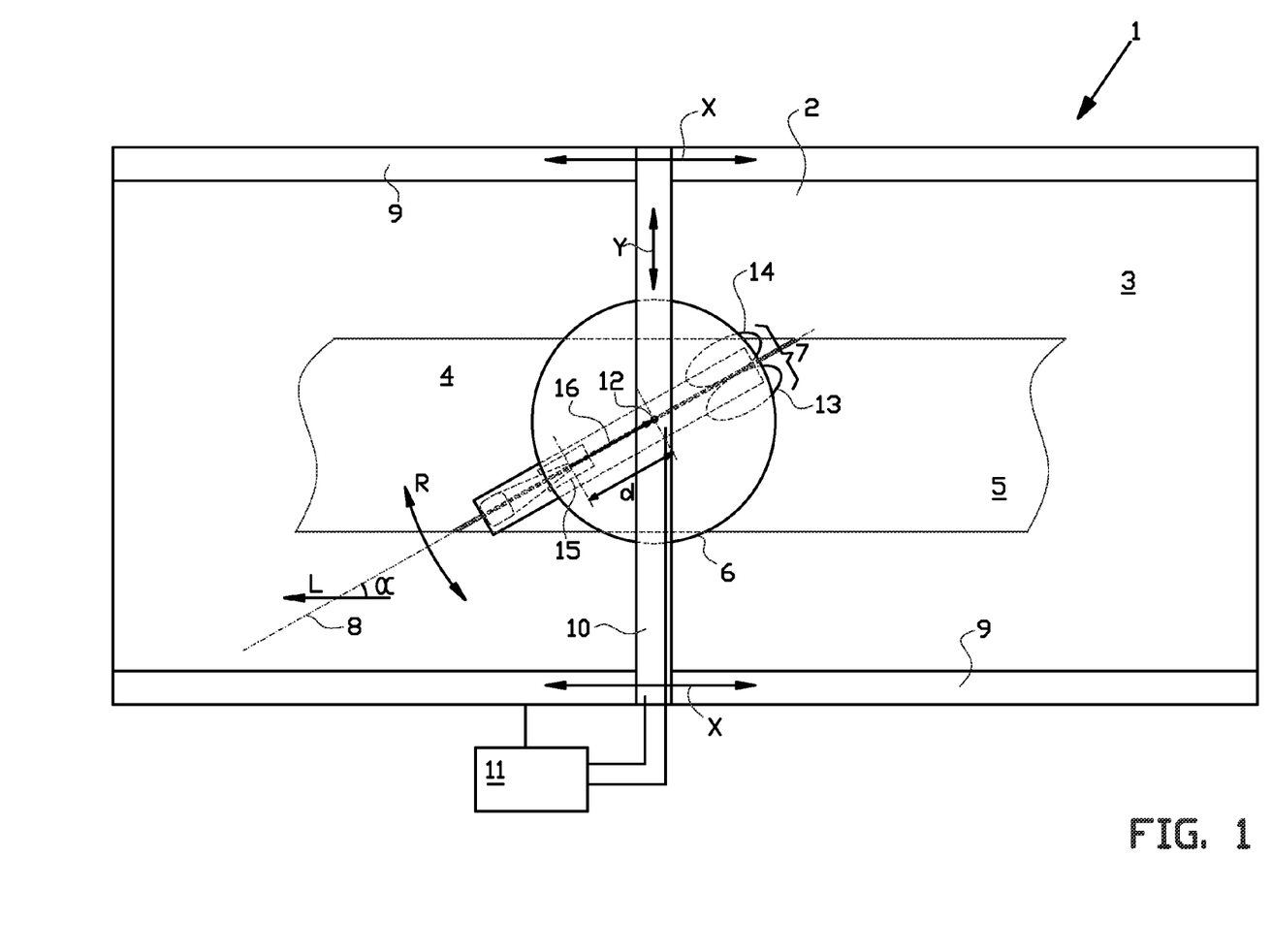
FIG. 1 shows a schematic top view of a stitcher according to the invention.

In FIG. 1 a schematic top view is shown of an exemplary embodiment of a stitcher 1 according to the invention. The stitcher 1 comprises a stitch table 2 with a surface 3 for placing thereon the edges of two consecutive strips of rubber material that are to be connected to each other, for instance a cord-reinforced rubber material 4, 5, for forming a substantially continuous strip having a longitudinal direction L.

Over the stitch table 2 a stitching head 6 is placed. The stitching head 6 is provided with a stitch unit 7 for stitching the edges of the two consecutive strips of rubber material 4, 5 together along a stitch line 8. The stitch line 8 and the longitudinal direction L include an angle α.

Furthermore a drive mechanism is placed over the stitch table 2. The drive mechanism comprises a first drive 9 for moving the stitching head 6 in a first direction, for instance along an X-axis, and a second drive 10 for moving the stitching head 6 in a second direction, for instance along a Y-axis. As shown in FIG. 1, the Y-axis extends substantially transverse to the X-axis. By suitable control of the first drive 9 and second drive 10 by a control device 11, the stitching head 6 can be moved along any desired line within the plane spanned by the X-axis and Y-axis, and the angle α can in principle be set within a range of 0-90 degrees.

For that purpose the control device 11 is connected to the first drive 9 as well as to the second drive 10. Furthermore the control device 11 is connected to the stitching head 6 for controlling it, as schematically shown in FIG. 1.

The stitching head 6 is rotatably connected to the second drive 10, and is rotatable about an axis of rotation 12. Due to an angular rotation R of the stitching head 6 about the axis of rotation 12, the stitching head 6 can be oriented such that the stitching rollers 13, 14 of the stitch unit 7 are able to roll along the stitch line 8.

The stitching head 6 is furthermore provided with a wheel 15 that is placed at a distance d from the axis of rotation 12. This so-called trailer wheel 15, will in case of a drive of the stitching head 6 along the stitch line 8, set the angular rotation R such that the connecting line 16, that connects the trailer wheel 15 and the axis of rotation 12, substantially coincides with the stitch line 8.

Figure 2:
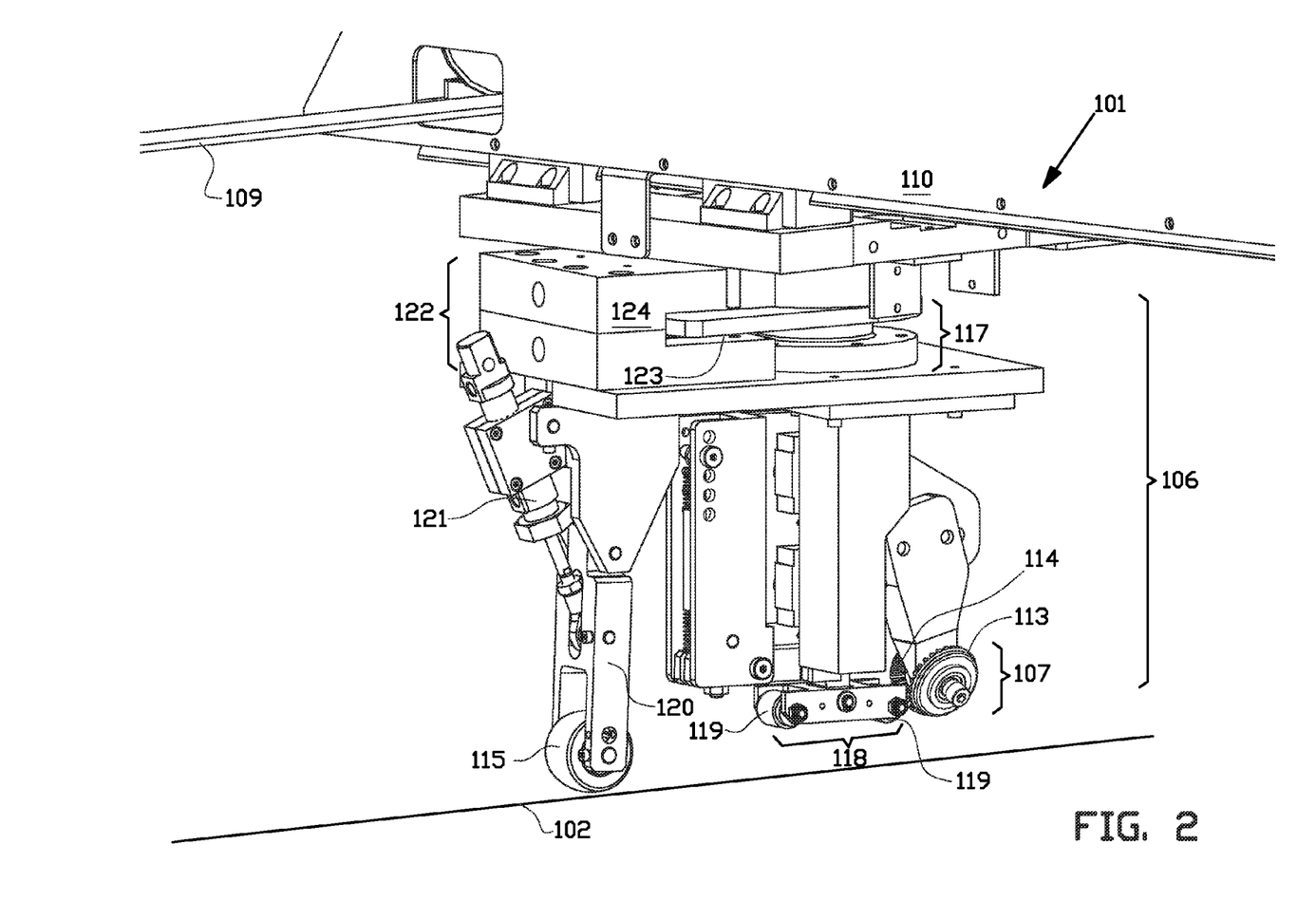
FIG. 2 shows a schematic side view of the stitching head with the wheel in the condition in which it is folded down.

FIG. 2 shows a schematic side view of an exemplary embodiment of a stitching head 106. The stitching head 106 is rotatably connected to a second drive 110, by means of a rotation element 117, and is placed over the surface of a stitch table 102. With its outer ends the second drive 110 is connected to a first drive 109 in a same way as schematically shown in FIG. 1.

The stitching head 106 comprises a first stitch unit 107 with a first stitching roller 113 and a second stitching roller 114 which at least during stitching are placed on either side of the stitch line in the same way as schematically shown in FIG. 1. The stitching rollers 113, 114 are placed inclined in a known manner (also see EP 0 698 479 A1). The stitching head 106 further comprises a second stitch unit 118 having stitching rollers 119, which in case of a movement of the stitching head 106 runs along the stitch line behind the first stitch unit 107, for stitching the two consecutive strips of rubber material together.

The stitching head 106 is furthermore provided with a wheel 115 functioning as a trailer wheel, and which in case of a drive of the stitching head 106 along the stitch line, will set the angular rotation such that the first stitch unit 107, the second stitch unit 118 and the trailer wheel 115 will come to sit in one line that will substantially coincide with the stitch line.

Figure 3:
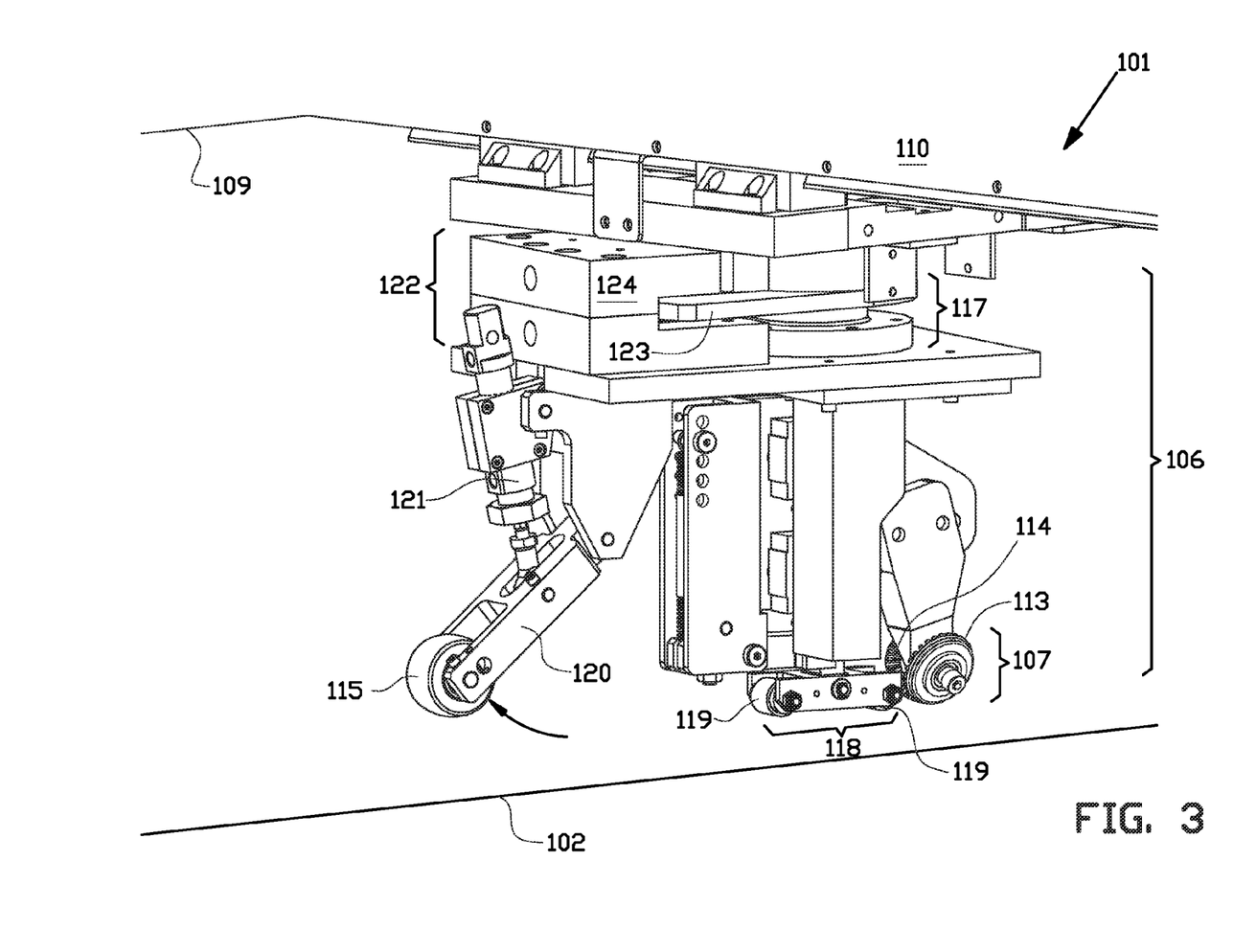
FIG. 3 shows a schematic side view of the stitching head with the wheel in the condition in which it is folded up.

The wheel 115 is substantially freely rotatably placed in a holder 120, such that the axis of rotation of the wheel 115 is substantially parallel to the surface of the stitch table 102 and substantially transverse to the connecting line of the first stitch unit 107, the second stitch unit 118 and the wheel 115. The holder 120 is hinged to the stitching head 106 and is coupled to a drive 121 that is able to move the holder 120 from a first position in which the wheel 115 is pushed towards the surface of the stitch table 102 as shown in FIG. 2, to a second position in which the wheel 115 is folded up at a distance over the surface of the stitch table 102 as shown in FIG. 3. In the embodiment as shown in FIGS. 2 and 3 a pneumatic drive cylinder is used as drive 121.

Furthermore a rotation element 117 of the stitching head 106 is provided with a retaining device or locking device 122 for retaining or locking the stitching head 106 against a rotation of the stitching head 106 about the axis of rotation. By retaining or by locking, it can substantially be prevented that the alignment of the stitching head 106 will wander.

In the exemplary embodiment of FIGS. 2 and 3 the retaining device or locking device 122 is designed as a clamping device having a clamping section 124 that is rotation-fixedly connected to the second drive 110, and wherein the rotatable part of the stitching head 106 is rotation-fixedly connected to a clamping plate 123. For blocking a rotation of the stitching head 106 about the axis of rotation, the clamping plate 123 is fixedly clamped by the clamping section 124, as a result of which a substantially rotation-fixed connection is realised between the stitching head 106 and the second drive 110.

The stitchers described above are adapted for stitching strips of rubber material together into a substantially continuous strip. A method for this among others comprises the following steps:

providing information regarding the desired angle α of the stitch line 8 with respect to the first direction X to the control device 11, uncoupling or unlocking the retaining device or locking device 122 (if present), as a result of which the stitching head 6, 106 is substantially freely rotatable about the axis of rotation 12, if necessary, placing the wheel 15, 115 in a first position in which the wheel 15, 115 with its tread abuts the surface 2, 102 or at least one of the strips of the rubber material, the control device 11 controlling the drive mechanism 9, 10; 109,110 for the movement of the stitching head 6, 106 along the first X and/or second Y direction such that the stitch unit 6, 106 at least substantially follows the stitch line 8 with the desired angle α, wherein during the movement of the stitching head 6, 106 the wheel 15, 115 with its tread rolls over the surface 2, 102 or over at least one of the strips of rubber material and the stitching head 6, 106 is rotated about the axis of rotation 12, at least until the connecting line between the axis of rotation 12 and the wheel 15, 115 is substantially parallel to the stitch line 8 with the desired angle α, coupling or locking the retaining device or locking device 122 (if present), for substantially blocking a rotation of the stitch unit 6, 106 about the axis of rotation, if necessary, placing the wheel 115 in a second position in which the wheel 115 is placed at a distance over the surface 102, placing one or two strips of rubber material 4, 5 with at least their edges that are to be stitched together on or near the stitch line 8 on the surface 2, 102 after which the control device 11 controls the drive mechanism 9,10;109,110 for moving the stitching head 6, 106 along the stitch line 8 for stitching the edges together.

It is advantageous in that case if the wheel 15, 115 at least during at least a part of the movement of the stitching head 6, 106 when aligning the stitching head 6, 106 with respect to the stitch line 8, is pushed towards the surface. In the exemplary embodiment as shown in FIGS. 2 and 3 this can simply be set by setting the pressure in the pneumatic cylinder 121.

Figure 4:
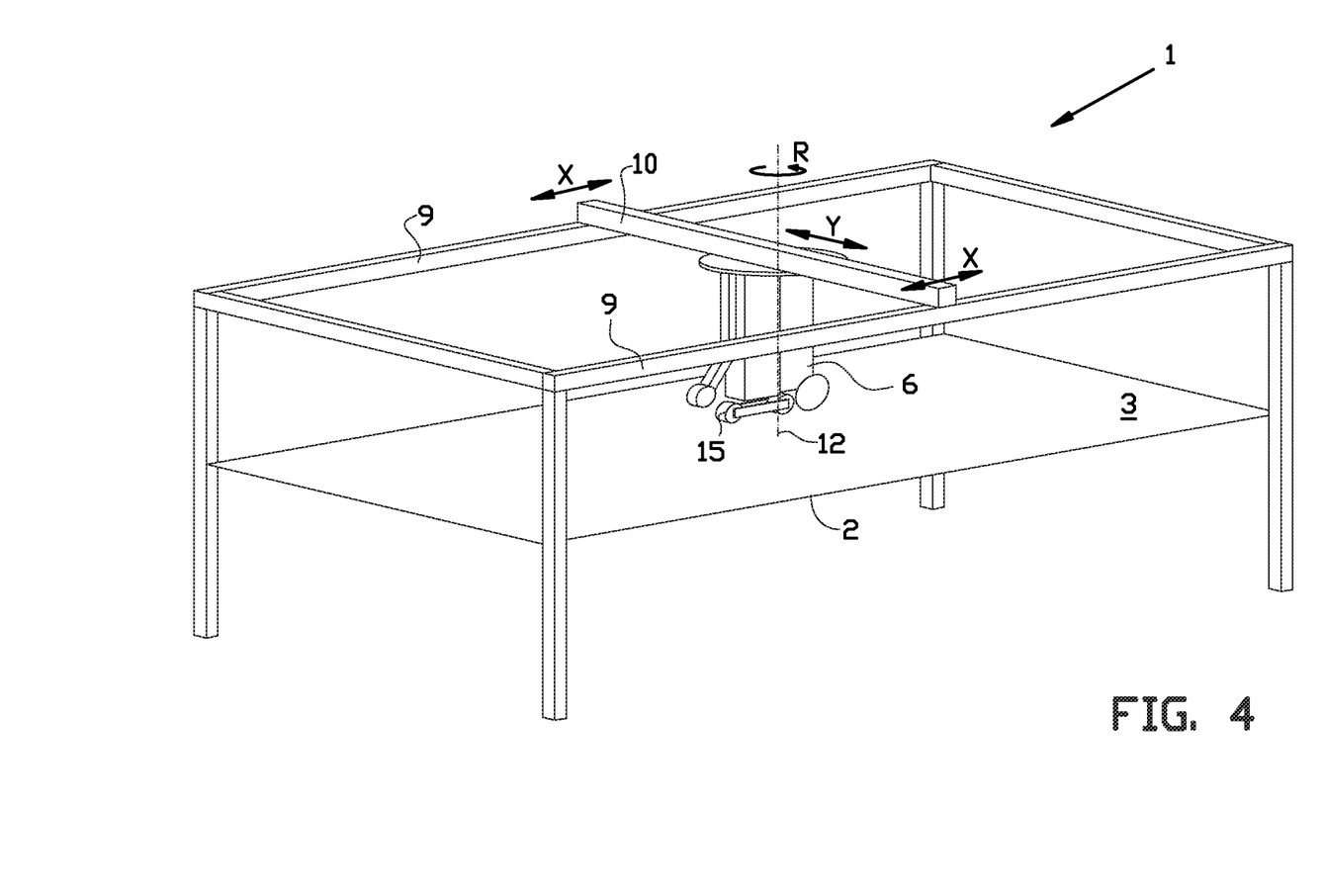
FIG. 4 shows a schematic view of the exemplary embodiment of the stitcher according to FIG. 1.

FIG. 4 shows a schematic view of the exemplary embodiment of FIG. 1. In this exemplary embodiment the stitcher 1 comprises a stitch table 2 wherein the surface is a side 3 of the stitch table that faces the stitch unit 6. The drive mechanism comprises a first drive 9 for moving a second drive 10 with stitching head 6 in the first direction (X-direction). The second drive 10 is adapted for moving the stitching head 6 in the second direction (Y-direction). The stitching head 6 is rotatable R about the axis of rotation 12. The stitching head 6 was described in more detail above with reference to FIGS. 2 and 3.

Figure 5:
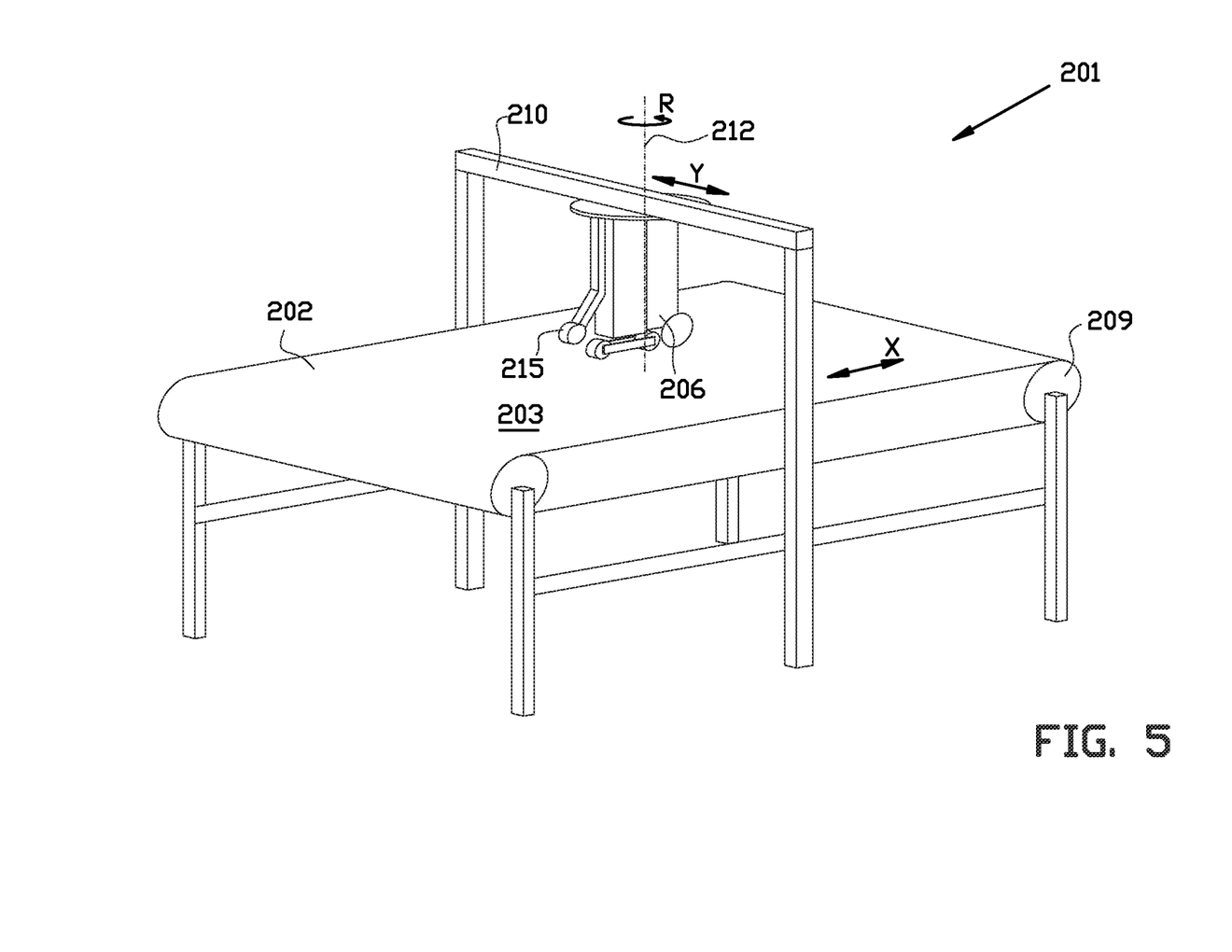
FIG. 5 shows a schematic view of a second exemplary embodiment of a stitcher according to the invention with a conveyor.

FIG. 5 shows a schematic view of an alternative exemplary embodiment. In this exemplary embodiment the stitcher 201 comprises a belt conveyor 202 having a conveyor belt 203, wherein the surface is a side of the conveyor belt 203 facing the stitch unit 206. The drive mechanism comprises a first drive 209 for moving the conveyor belt 203 in the first direction (X-direction). The drive mechanism further comprises a second drive 210 for moving the stitching head 206 in the second direction (Y-direction). The stitching head 6 is rotatable R about the axis of rotation 212 and was described in more detail above with reference to FIGS. 2 and 3.

Figure 6:
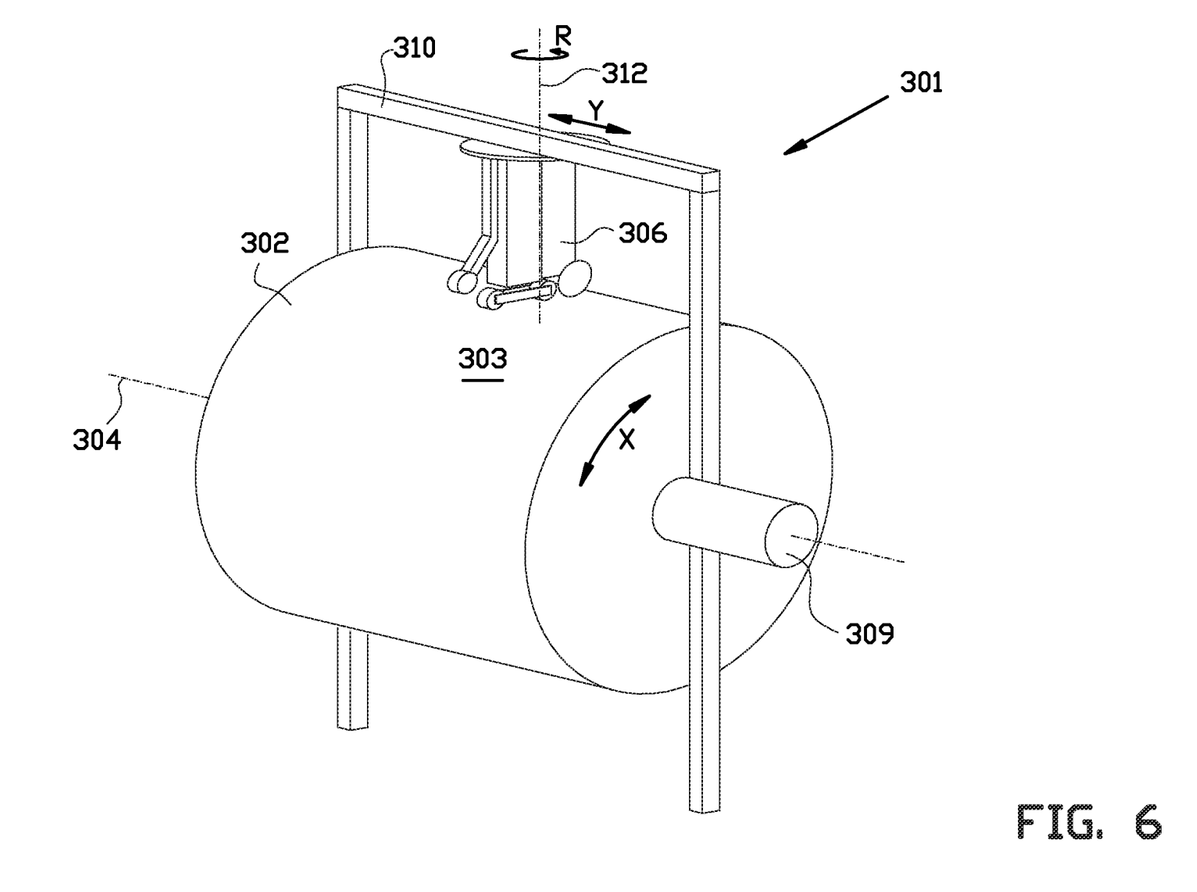
FIG. 6 shows a schematic view of a third exemplary embodiment of a stitcher according to the invention with a building drum.

FIG. 6 shows a schematic view of a further alternative exemplary embodiment. In this exemplary embodiment the stitcher 301 comprises a building drum 302 that is rotatable about an axis 304, wherein the surface is a circumferential side 303 of the building drum 302 that faces the stitch unit 306. The drive mechanism comprises a first drive 309 for rotatingly driving the building drum 302 for moving the circumferential surface 303 in the first direction (X-direction). The drive mechanism further comprises a second drive 310 for moving the stitching head 306 in the second direction (Y-direction). The stitching head 306 is rotatable R about the axis of rotation 312 and was described in more detail above with reference to FIGS. 2 and 3.

The above description is included to illustrate the operation of preferred embodiments of the invention and not to limit the scope of the invention. Starting from the above explanation many variations that fall within the scope of the present invention will be evident to an expert.

Summarising the invention relates to a stitcher for connecting strips of rubber material into a substantially continuous strip according to this invention comprises a surface, a stitching head placed over it having a stitch unit for stitching the strips of rubber material together along a stitch line, which stitch line includes an angle α having a longitudinal direction of the continuous strip, a drive mechanism for driving a relative movement of the stitching head with respect to the surface along a first and a second direction, wherein the second direction is oriented transverse to the first direction, and a control device for controlling the drive mechanism such that the stitch unit follows the stitch line. In one embodiment the stitching head is rotatably connected to the drive mechanism wherein the axis of rotation extends transverse to the surface. The stitching head furthermore comprises a wheel that is placed at a distance from the axis of rotation, wherein the wheel with its tread abuts the surface.

LIST OF REFERENCE NUMBERS 1. stitcher
2. stitch table
3. surface of stitch table
4. strip of cord-reinforced rubber material
5. strip of cord-reinforced rubber material
6. stitching head
7. stitch unit
8. stitch line
9. first drive of the drive mechanism
10. second drive of the drive mechanism
11. control device
12. axis of rotation
13. stitching roller
14. stitching roller
15. wheel
16. connecting line
101. stitcher
102. stitch table
106. stitching head
107. first stitch unit
109. first drive of the drive mechanism
110. second drive of the drive mechanism
113. stitching roller
114. stitching roller
115. wheel
117. rotation element
118. second stitch unit
119. stitching roller
120. holder for wheel
121. drive
122. retaining device or locking device
123. clamping plate
124. clamping section
201. stitcher
202. belt conveyor
203. conveyor belt
206. stitching head
209. first drive of the drive mechanism
210. second drive of the drive mechanism
212. axis of rotation
301. stitcher
302. building drum
303. circumferential surface of the building drum
306. stitching head
309. first drive of the drive mechanism
310. second drive of the drive mechanism
312. axis of rotation

The invention claimed is:

1. Stitcher for stitching strips of rubber material together into a substantially continuous strip, comprising:
a surface for placing thereon at least the edges of the strips of rubber material to be stitched together,
a stitching head including stitch unit placed over the surface for stitching the edges of the strips of rubber material together along a stitch line, wherein the stitch line and a longitudinal direction of the continuous strip include an angle α,
a drive mechanism for driving a relative movement of the stitching head with respect to the surface along a first and a second direction, wherein the second direction is oriented at least substantially transverse to the first direction, and
a control device for controlling the drive mechanism for the relative movement of the stitching head with respect to the surface along the first and/or second direction such that the stitch unit at least substantially follows the stitch line,
wherein the stitching head is connected to the drive mechanism so as to be rotatable with respect to the drive mechanism about an axis of rotation, wherein the axis of rotation extends at least substantially transverse to the surface, wherein the stitching head comprises a retaining device or locking device for retaining or locking the stitching head against a rotation of the stitching head rotatable with respect to the drive mechanism about the axis of rotation, and
wherein the stitching head comprises a wheel placed at a distance from the axis of rotation, wherein the wheel with its tread abuts the surface or at least one of the strips of the rubber material, wherein the retaining device or locking device is arranged to be uncoupled or unlocked, such that the stitching head is freely rotatable by the wheel with respect to the drive mechanism about the axis of rotation and the wheel is oriented in movement direction behind the axis of rotation in case of a movement of the stitching head along the stitch line, for setting the angular rotation of the stitching head for stitching at the set angle α.

2. Stitcher according to claim 1, further comprising a stitch table, wherein the surface is a side of the stitch table facing the stitch unit, and wherein the drive mechanism comprises a first drive for moving the stitching head in the first direction and a second drive for moving the stitching head in the second direction.

3. Stitcher according to claim 1, further comprising a belt conveyor having a conveyor belt, wherein the surface is a side of the conveyor belt facing the stitch unit, and wherein the drive mechanism comprises a first drive for moving the conveyor belt in the first direction and a second drive for moving the stitching head in the second direction.

4. Stitcher according to claim 1, further comprising a building drum rotatable about an axis, wherein the surface is a circumferential side of the building drum facing the stitch unit, and wherein the drive mechanism comprises a first drive for rotatingly driving the building drum for moving the circumferential surface in the first direction and a second drive for moving the stitching head in the second direction.

5. Stitcher according to claim 1, wherein the wheel is moveable between a first position in which the wheel with its tread abuts the surface or at least one of the strips of the rubber material, and a second position in which the wheel is placed at a distance over the surface.

6. Stitcher according to claim 1, wherein the stitching head comprises a tensioning member, wherein the tensioning member is adapted for, when operational, pushing the wheel towards the surface.

7. Stitcher according to claim 6, wherein the tensioning member comprises a pneumatic cylinder.

8. Stitcher according to claim 1, wherein the first direction is oriented substantially parallel to the longitudinal direction and the second direction is oriented substantially transverse to the longitudinal direction.

9. Stitcher according to claim 1, wherein the stitch unit is a first stitch unit and wherein the stitching head comprises a second stitch unit, wherein the second stitch unit is placed in line behind the first stitch unit, and wherein the wheel is placed in line with both the first and the second stitch unit.

10. Method for stitching strips of rubber material together into a substantially continuous strip using a stitcher according to claim 1, comprising the steps of:
   a. providing information to the control device regarding the desired angle α of the stitch line with respect to the first direction,
   b. the control device controlling the drive mechanism for driving a relative movement of the stitching head with respect to the surface along the first and/or second direction such that the stitching unit at least substantially follows the stitch line with the desired angle α, and
   c. wherein during the relative movement of the stitching head the wheel with its tread rolls over the surface or over at least one of the strips of rubber material and the stitching head is rotated about the axis of rotation, at least until the connecting line between the axis of rotation and the wheel are substantially parallel to the stitch line with the desired angle α.

11. Method according to claim 10, wherein prior to step b. the wheel was or is placed in a first position in which the wheel with its tread abuts the surface or at least one of the strips of the rubber material, and wherein the wheel after step c. is placed into a second position in which the wheel is placed at a distance above the surface.

12. Method according to claim 10, wherein the stitching head comprises a tensioning member and wherein the tensioning member, at least during at least a part of the movement of step c., pushes the wheel towards the surface.

13. Method according to claim 10, wherein prior to step b. the retaining device or locking device is uncoupled or unlocked as a result of which the stitching head is rotatable about the axis of rotation, and wherein at the end of step c. or after step c. the retaining device or locking device is coupled or locked for substantially blocking a rotation of the stitch unit about the axis of rotation.

14. Method according to claim 10, wherein after step c. one or two strips of rubber material with at least their edges that are to be stitched together are placed on or near the stitch line on the surface, and wherein the control device controls the drive mechanism for moving the stitching head along the stitch line for stitching the edges together.

* * * * *